March 28, 1967     G. R. SIMPSON ETAL     3,311,846
POLARIZING APPARATUS USING INCLINED PLATES
OF LASERABLE MATERIAL
Filed June 20, 1963     2 Sheets-Sheet 1
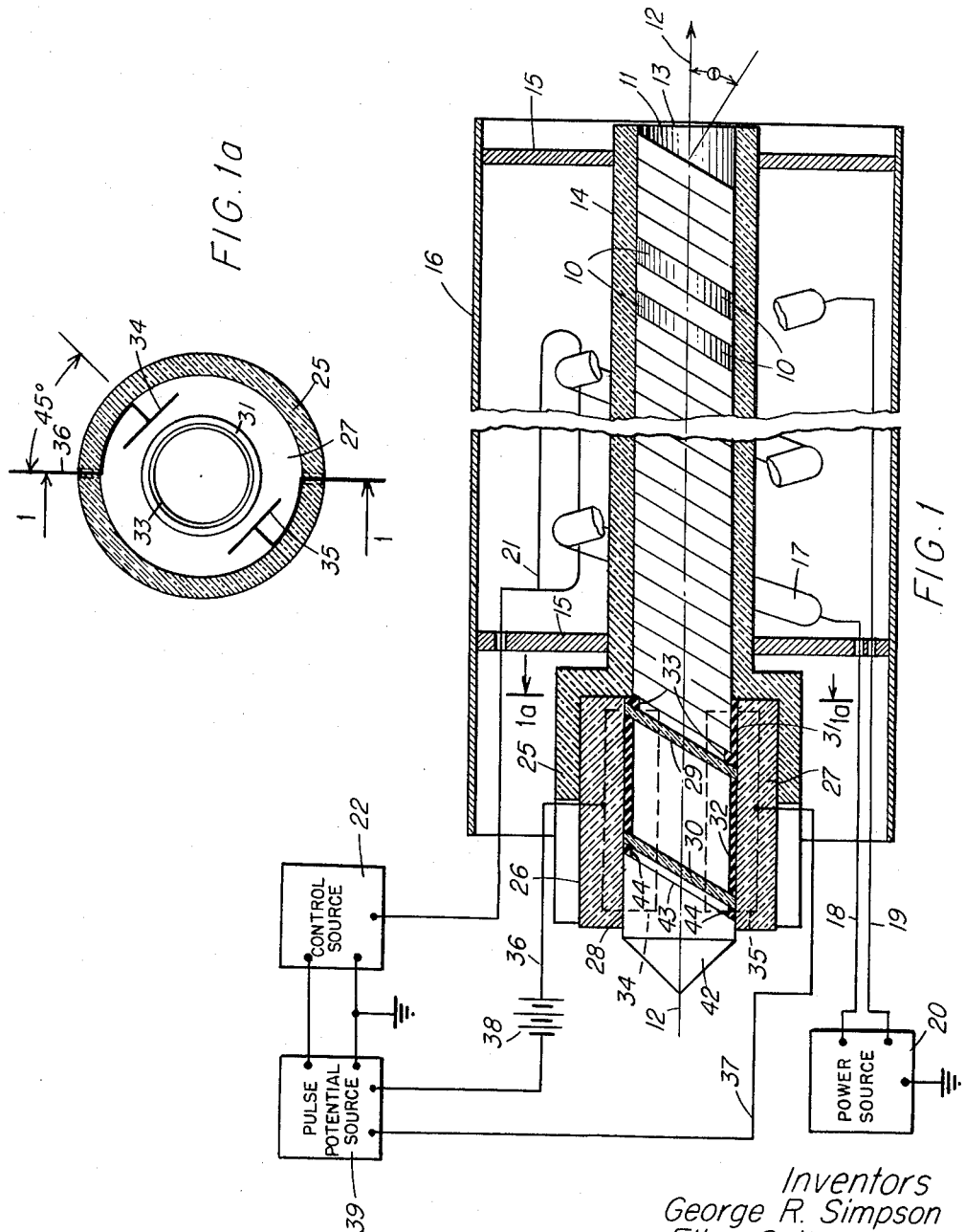
*Inventors*
George R. Simpson
Elias Snitzer
By John A. Harvey
*Attorney*

Inventors
George R. Simpson
Elias Snitzer
By John A. Harvey
Attorney

United States Patent Office

3,311,846
Patented Mar. 28, 1967

3,311,846
POLARIZING APPARATUS USING INCLINED
PLATES OF LASERABLE MATERIAL
George R. Simpson, South Woodstock, Conn., and Elias
Snitzer, Sturbridge, Mass., assignors to American Optical Company, Southbridge, Mass., a voluntary association of Massachusetts
Filed June 20, 1963, Ser. No. 289,252
5 Claims. (Cl. 331—94.5)

The present invention relates to laser structures and, particularly, to laser structures controllably operated to generate pulses of light output.

There are a number of solid-state materials having such atomic structures that certain of their atoms may absorb photons of light energy of appropriate frequency and be thereby elevated from a lower energy level to a higher energy level. The atoms usually experience an immediate non-radiative transition from this higher energy level to a lower energy level at which the atoms remain with transition stability for a short interval. When the number of atoms at the relatively stable higher energy level exceeds the number at the lower energy level, a condition known as an inversion of energy population states, transitions by the atoms from the relatively stable energy level to some lower energy level takes place and light energy of a characteristic narrow band of frequencies is emitted. Such transitions may be by spontaneous action, in which event the emission of light by atoms making the transition is non-coherent, or the transitions may be stimulated by passage through the laser material of light energy of the characteristic band of frequencies and in this event the emission of light by stimulation is coherent. Coherent light emission is greatly augmented by placing the laser element between reflective surfaces terminating the ends of a propagation path extending through the element, or by using a relatively elongated laser component and by placing at least partially reflective surfaces at its ends, for the purpose of reflecting emitted light back and forth through the laser material to enable these multiple reflections of light to attain even greater stimulation of light emission. This form of structure is said to have resonance characteristics and is commonly called a Fabry-Perot interferometer type of structure. The ratio of energy storage to energy dissipation per light cycle is proportionately related to what is known as the Q of the structure. Coherent emission of light energy by stimulation increases with increase in the value of Q of the resonant structure.

The light energy employed in raising the energy level of atoms of a laserable material is conventionally provided by a so-called pumping light source of which a gaseous discharge flash tube is illustrative. This type of source is energized and controlled to emit successive pulses of high-intensity light energy, each pulse having a duration of the order of a millisecond. During each of these relatively prolonged light pulses, lasering action builds up somewhat slowly so that the leading edge of the output laser light pulse wave form rises more slowly than may be desirable. In addition, the lasering action may repetitively start and terminate during one pumping light pulse to result in often undesirable multiple output laser light pulses. Often there will be sufficient inversion of population with respect to the two energy levels at which stimulated emission of light takes place as to result in a form of steady state effect wherein the magnitude of available inversion becomes relatively constant. This condition is explained by the fact that transitions of the high-energy level atoms to a lower energy level by the incoherent and stimulated coherent light emissive action approximates the rate at which atoms are pumped from the lower to the higher energy level. This steady state condition of lasering operation has the disadvantage in certain applications that it prolongs the lasering interval and reduces the maximum value of laser light peak output intensity.

It has heretofore been proposed that the Q of laserable resonant structures be dynamically controlled to change from a low to a high Q condition at the time a laser light output pulse is desired following initiation of each light pumping interval. This enables a larger magnitude of inversion of energy population states to be attained while the Q of the resonant structure is low, and thus the creation of a laser light pulse of more steeply rising wave front and of larger peak intensity upon change to a high Q condition. Subsequent change from a high to a low Q condition of the resonant structure may be used to terminate the laser light output pulse prematurely, thus enabling the creation of high intensity laser light pulses of short duration. Such Q-control is conventionally referred to as Q switching.

A novel form of Q switching structure is disclosed in the Snitzer et al. copending application Ser. No. 212,795, filed July 27, 1962, entitled, Laser Structure, and assigned to the same assignee as the present application. In this structure, a laser component is placed within a Fabry-Perot type of interferometer providing a light energy propagation path extending through the laser component and terminated at each end by a light reflective surface. One of these terminating surfaces is spaced from the laser component, and crossed polarizer elements with an intervening Kerr cell is inserted between the laser component and the spaced terminating light reflective surface. When the Kerr cell is electrically deenergized, laser light emitted by the laser component and plane polarized by the adjacent polarizing element passes through the Kerr cell without rotation of the plane of polarization and accordingly is blocked by the second polarizing element so that this light energy is not returned by reflection to the laser component. This results in a low Q condition of the resonant structure. Upon appropriate electrical energization of the Kerr cell, however, the plane of the polarized light is rotated by the cell in both directions of light transmission so that now the laser emitted light is returned by reflection to the laser component and a high Q condition of the resonant structure prevails. While there is some attenuation of light energy having the desired plane of polarization by Fresnel reflections from the surfaces of the Q-control components included in the light propagation path, this attenuation is not particularly significant in many applications although even in these applications it would be desirable that such light attenuation be avoided. This resonant structure enables Q-switching control for reasonably high laser light peak intensities, but is somewhat limited in the maximum peak intensities with which it may operate reliably over prolonged operational periods.

It is an object of the present invention to provide a laser structure which enables the generation in a new and improved manner of large amplitude and short duration output pulses of plane-polarized laser light energy.

It is a further object of the invention to provide a novel laser structure adapted to generate high-intensity plane-polarized laser light energy, and one having improved reliability and efficiency in controlling with rapidity and ease the intensity of the generated light energy.

It is an additional object of the invention to provide a novel laser structure characterized by improved operating efficiency and by enhanced threshold level at which significant spontaneous laser emission may take place.

Other objects and advantages of the invention will appear as the detailed description thereof proceeds in the light of the drawings forming a part of this application and in which:

FIG. 1 is a cross-sectional view and illustrates schematically a laser structure embodying the present invention in a particular form;

FIG. 1a is a cross-sectional view taken along the plane 1a—1a of FIG. 1 to illustrate a feature of the construction.

Figure 2A:
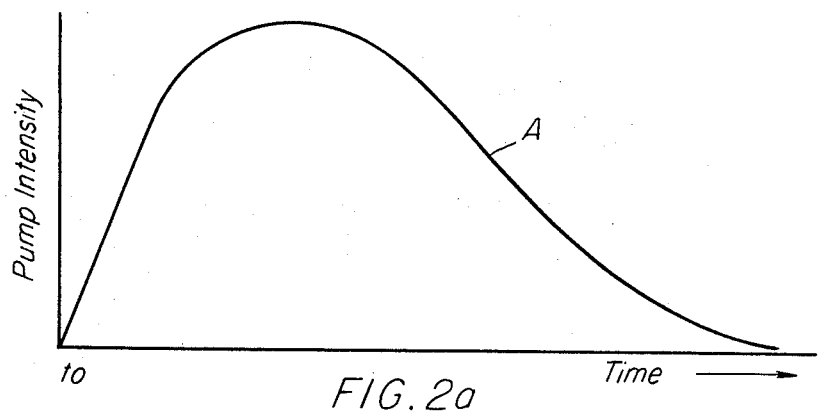
FIGS. 2a, 2b and 2c graphically illustrate certain operating characteristics of the FIG. 1 structure and are used as an aid in explaining its operation.

Referring now more particularly to FIG. 1 of the drawings, the laser structure there illustrated includes a plurality of plates or discs 10 of laserable material having substantially parallel and planar faces except for an endmost element 11 which has an inner face sloping at an angle $\theta$ from a position normal to the axis 12—12 of the stack of discs 10 and an outer face 13 normal to the axis 12—12. The discs 10 have elliptical cross-section and a peripheral surface defining a cylindrical projection corresponding to, and providing a sliding fit within, the internal bore of a transparent cylindrical supporting tube 12 within which the discs 10 are stacked with their parallel faces forming an angle $\theta$ from a position normal to the axis 12—12 of the stack. The angle $\theta$ preferably is equal to Brewster's angle at which light energy traveling parallel to the axis 12—12 has an electric vector component normal to the plane of cross-section of FIG. 1 and this component is reflected out of the stack of discs 10 by Fresnel reflection at each face of the discs. The electric vector component of light energy in the plane of the cross-section then experiences no reflection at the interfaces of the discs and accordingly propagates axially along the disc stack. For maximum reflectivity of the normal light component just mentioned, the faces of the discs 10 are polished and the faces of adjacent discs may lightly engage one another or may be separated by a small air space.

The cylindrical tube 14 is supported by apertured discs 15, 15 in coaxial position within a housing 16 of cylindrical configuration and having a highly reflective inner surface. Supported in concentric relation with the tube 14, by conventional supporting structure not shown, is a helical gaseous discharge tube 17 having end electrodes electrically connected by conductors 18 and 19 to a power source 20 of conventional nature. The initiation of gaseous discharge through the tube 17 is controlled by an electrode 21 comprising a closed conductive loop which threads the convolutions of the tube 17 as shown and which is energized in conventional manner by a control potential source 22. The gaseous discharge tube 17 forms a source of pumping light for the laser discs 10, the reflective interior surface of the housing 16 serving to concentrate the pumping light energy into the discs.

The cylindrical glass tube 14 has an enlarged cylindrical end portion 25 having a concentric end bore 26 within which is positioned a sleeve 27 of glass or other dielectric material having a concentric bore 28 slightly larger in diameter than the interior smaller bore of the cylindrical tube 14. Fabricated within the bore 28 of the sleeve 27 is a Kerr cell comprised by end windows 29 and 30 enclosing a suitable Kerr liquid, such as carbon disulfide or paraldehyde or nitrobenzol. The windows 29 and 30 have parallel faces which likewise are oriented by the angle $\theta$ from a position normal to the axis 12—12 of the structure and are maintained in assembled relation at this angle and in spaced relation to one another by sleeves 31 and 32 fitted within the bore 28 of the sleeve 27 as shown. A small air space is preferably provided between the adjacent faces of the window 29 and the last of the discs 10 by use of a narrow sleeve 33 as shown. It will be understood that a suitable hermetic seal is provided between each of the windows 29 and 30 and the bore 28 of the sleeve 27 to prevent escape of the Kerr liquid within the Kerr cell. The conventional electrodes 34 and 35 of the Kerr cell may be conveniently molded within the sleeve 27 and are oriented at 45° to the sectional plane of FIG. 1 as illustrated more clearly in FIG. 1a. These electrodes are energized by lead out conductors 36 and 37 from a unidirectional potential source shown as a battery 38 connected in series with a pulse potential source 39. The latter operates to generate a potential pulse of amplitude equal to the potential of the battery 38, but of opposite polarity thereto, and in preselected time relationship to each energizing pulse generated by the control source 22 and applied to energize the control electrode 21.

The end of the bore 28 of the sleeve 27 is closed by a roof prism element 42 having an inner face 43 oriented by the angle $\theta$ from a position normal to the axis 12—12 of the structure and spaced from the face of the adjacent window 30 by a spacing ring 44. The roof prism 42 serves to reflect and return to the Kerr cell all light energy which is transmitted to the roof prism by the Kerr cell. The roof prism 42 thus provides a reflective end termination for a light propagation path extending through the discs 10 and the Kerr cell, a partially reflecting termination of this propagation path at its opposite end being provided by Fresnel reflections from the polished surface 13 of the end laser element 11.

In considering the operation of the laser structure just described, it will be assumed that the control source 22 energizes the control electrode 21 at time to initiate gaseous discharge through the tube 17 of electrical energy supplied from the power source 20. This gaseous discharge generates a high-intensity pulse of pumping light having a light intensity graphically indicated by curve A in FIG. 2a. The high intensity light pulse causes an inversion of energy states of the atoms of the laserable material of which the discs 10 are formed. Atoms in the higher energy state may undergo a spontaneous transition to a lower energy state, and in doing so produce emission of light energy having a characteristic narrow band of frequencies. This emitted light travels in all directions. The material of the cylindrical tube 14 preferably is selected to have a smaller index of refraction than does the laserable material of which the discs 10 are formed, so that all axially directed light energy which is incident on the interface between the discs 10 and the tube 14 at greater than the critical angle is reflected along the axis 12—12 of the structure toward the Kerr cell.

This spontaneously emitted light traveling toward the Kerr cell has an electric vector component normal to the cross section of FIG. 1 and an electric vector component in the plane of the cross section. The normal component of light is attenuated approximately 30% at each disc interface (two glass-air interfaces) by reflection and thus is directed out through the cylindrical tube 14 so that it is ineffective to stimulate further light emission by the discs 10. The electric vector light component which lies in the plane of cross section of FIG. 1 experiences no reflection at the laser disc interfaces by virtue of Brewster's angle $\theta$ at which the faces of the discs 10 are oriented with respect the axis 12—12, and accordingly this light component travels without attenuation as plane polarized light to the Kerr cell. Assume that the electrodes 34 and 35 of the Kerr cell are not energized at this time by reason of an opposite polarity pulse potential supplied from the source 39 to overcome the voltage of the battery 38. The plane polarized light received at the Kerr cell is translated by the latter to the roof prism 42 without any rotational change of the plane of polarization, and is reflected to return through the Kerr cell again without any rotational change of the plane of polarization back into the discs 10. This spontaneously emitted and reflected light is accordingly available to effect further stimulation of light emission by the discs 10. Consequently, under the foregoing assumed conditions, laser light emission by stimulation proceeds rapidly and in cumulative manner by light energy reflected back and forth between the roof prism 42 and the Fresnel reflector provided by the polished face 13 of the end laser element 11. This stimulated light is plane polarized in the same direction as the stimulating photon, and thus a high-intensity pulse of plane polarized laser light energy is quickly generated and in large part propagates through the reflective surface 13 of the end laser element 11 as indicated by the arrow in FIG. 1. It will be recognized that the foregoing described laser operation typifies high Q operational conditions of the resonant laser structure.

Figure 2B:
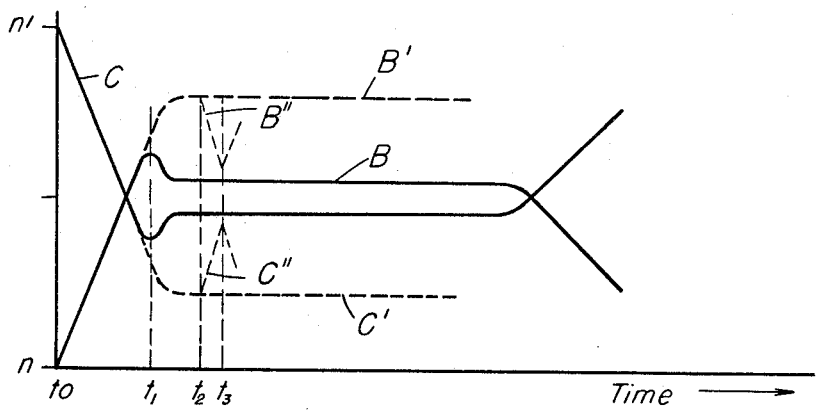
Figure 2C:
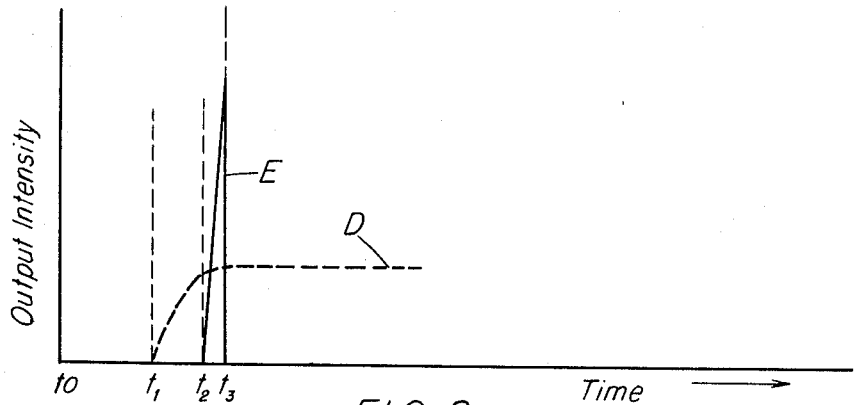

The laser operation just described is shown graphically in FIGS. 2b and 2c. Curve B of FIG. 2b represents the increase in the total number $n$ of atoms of the disc laserable material which absorb photons of the pumping light and are accordingly raised to a high energy level. Curve C of FIG. 2b correspondingly represents the decrease of the number $n'$ of atoms remaining at the lower energy level. When the number of atoms at the higher energy level exceeds the number at the lower energy level by an amount varying inversely with the Q of the laser resonant structure above described, lasering action may be initiated (under the conditions previously assumed) by stimulation of light of the characteristic narrow band of frequencies passing through the discs 10. Assume that this condition of population inversion occurs at time $t_1$. As indicated by the broken line curve D of FIG. 2c, the intensity of the stimulated plane-polarized light emission increases and at the same time the relative numbers of atoms in the higher and lower states respectively decrease and increase as represented by curves B and C of FIG. 2b. The latter curves are drawn for the assumed condition that the Kerr cell electrodes 34 and 35 remain deenergized throughout the entire pumping light pulse represented by curve A of FIG. 2a. A condition of equilibrium is reached when the number of atoms being raised to the higher energy level by the pumping light equals the number of atoms experiencing transition from the higher energy level to the lower energy level with concurrent emission of light energy. For this operating condition, the intensity of the light emitted by lasering action of the discs 10 reaches its maximum amplitude somewhat in the manner indicated by the plateau portion of curve D of FIG. 2c. While FIGS. 2b and 2c indicate that the laser light intensity builds up to and remains at a constant amplitude, in practice it is often found that a form of relaxation action causes multiple pulses of laser light output to be developed during the interval of the pumping light pulse indicated graphically by curve A of FIG. 2a.

Consider now the changed character of operation prevailing during the interval of a pulse of pumping light created by the flash tube 17 and under the assumption, contrary to that assumed above, that the full potential of the battery 38 is applied to the electrodes 34 and 35 of the Kerr cell. The value of this potential is selected to effect operation of the Kerr cell in a manner equivalent to that of a ¼ wave retardation plate, whereby plane-polarized light energy received by the Kerr cell has its plane of polarization rotated by an angle of 45° while passing through the Kerr cell. This light energy of rotated polarization is reflected by the roof prism 42 and passes in reverse direction through the Kerr cell where its plane of polarization is again rotated by 45°, so that the light energy emerges from the Kerr cell with its electric vector normal to the plane of cross section of FIG. 1. It will be apparent that this light energy has the proper polarization to be reflected (by approximately 30%) at each interface of the discs 10 and accordingly is quickly directed out of the discs 10 and into and through the cylindrical tube 14. Thus although the light originating by spontaneous emission in the laserable material of the discs 10 may make one pass through the discs before entering the Kerr cell, the reflected light emitted by the Kerr cell is quickly attenuated by reflection after passing through only a relatively few of the discs 10 adjacent the Kerr cell and, therefore, is not available to effect significant stimulation of further light emission by the discs. It will be recognized that this operation corresponds to a low Q operational condition of the laser resonant structure. The number of excited atoms raised to and remaining in the upper energy level can now be much larger as indicated by the broken line extension B' of curve B of FIG. 2b. There are correspondingly fewer numbers of atoms remaining in the lower energy level as indicated by the broken line extension C' of curve C. For this operating condition, the number of atoms raised to the upper energy level is eventaully limited during the applied pumping light pulse by spontaneous atom transitions (and possible relaxation forms of energy transitions) to equal the number of atoms being raised to the higher energy level during each small time increment.

If a potential pulse is generated by the source 39 of equal amplitude but opposite polarity to the potential of the battery 38 to deenergize the electrodes 34 and 35 of the Kerr cell during the operational conditions last considered, the high Q resonant structure operation first described immediately takes place. Assume that the electrodes 34 and 35 of the Kerr cell are deenergized at the time $t_2$ shown in FIGS. 2b and 2c. The stimulated emission of light by laser action now increases rapidly to a maximum amplitude value much larger than could prevail for the condition of constant but high value of Q throughout the pumping light pulse interval. Assume further that the electrodes 34 and 35 of the Kerr cell are reenergized at time $t_3$. The value of Q of the laser resonant structure almost immediately decreases to its lower value with consequent immediate termination of significant laser action. The resultant pulse of output light created by lasering action during the interval of deenergization of the Kerr cell electrodes is represented by curve E of FIG. 2c. It will be evident that peak amplitude or intensity of the laser output light pulse is now substantially larger in value than in the case represented by the plateau portion of curve D which, as earlier explained, is applicable to the amplitude of laser light created during conditions of constant but high Q operation of the resonant structure. Also it will be evident from FIG. 2c that the output light pulse, represented by curve E, produced during the interval of deenergization of the Kerr cell electrodes may have very short pulse duration controlled by the duration of the opposite-polarity pulse potential generated by the source 39. For the pulsed Q switching of the resonant laser structure here considered, the initiation of stimulated light emission occurs at a time when there is a very large population inversion state of the laserable material of the discs 10 and the increase in amplitude or intensity of the laser output light pulse therefore occurs at a very rapid rate. Thus the wave form of the output laser light pulse has an exceptionally steep leading edge by reason of the rapid build-up of output light intensity. The decrease in the number of atoms in the upper energy level occurring during the interval of deenergization of the Kerr cell electrodes is represented in FIG. 2b by the broken line extension B'' of curve B, whereas the increase in the number of atoms in the lower energy level during this interval is represented by the broken line extension C'' of curve C. It will be noted that upon resumption of energization of the Kerr cell electrodes the inversion of population states begins again and quickly rises to maximum value so that multiple large amplitude output laser light pulses often may be created during each pulse of the pumping light if multip'e potential pulses are generated by the source 39 to effect multiple deenergization intervals of the Kerr cell electrodes during the pumping light pulse interval.

It will be apparent from the foregoing description of the invention that a laser structure embodying the invention is characterized by substantially improved operating efficiency and by an enhancement of the threshold level at which significant spontaneous laser stimulated emission may take place. The laser structure of the invention has improved reliability in controlling with rapidity and ease the generation of high-intensity plane-polarized laser output light energy of short pulse duration and steep leading and lagging edge wave form. The absence in a laser structure embodying the invention of any need for state polarization control elements effects an improvement of operating efficiency by avoiding attenuation of light energy in the desired plane of polarization by Fresnel reflections which inherently occur at the surfaces of static polarizing elements, and by eliminating such static palorizing elements the power handling capabilities of the laser structure are not limited to the power levels at which such static polarizing elements may safely be operated.

While a specific form of the invention has been described for purposes of illustration, it is contemplated that numerous changes may be made without departing from the spirit of the invention.

What is claimed is:
1. A laser structure comprising
   a plurality of plates of solid laserable material having substantially parallel and planar faces,
   means for retaining said plates in stacked relation along a preselected axis and with the planar faces thereof oriented in relation to said axis to provide plane polarized light for light propagated along a light propagation path extending through said plates parallel to said axis,
   means including polarization control means in said light propagation path to provide controlled polarization change for plane-polarized light propagated to said control means, and light reflective means terminating at least one end of said path for effecting repropagation by said control means of light previously propagated thereby.

2. The invention according to claim 1 wherein said second means comprises a Kerr cell.

3. The invention according to claim 1 wherein said means for retaining comprises a cylindrical tube of transparent material.

4. The invention according to claim 3 wherein said plates are discs of elliptical cross section and the peripheral surface of each of said discs axially define at said face orientation thereof a cylindrical projection corresponding to and having a sliding fit with the interior wall surface of said tube.

5. The invention according to claim 1 wherein said polarization control means comprising a material having birefringent properties in the presence of an electric field and being confined between light transmissive planar surfaces having said axial orientation, and electrodes spaces on opposite sides of said material with an orientation of approximately 45° to said polarized light component for energization with a control potential.

References Cited by the Examiner

FOREIGN PATENTS 608,711  3/1962  Belgium.

OTHER REFERENCES

Brewster: "Chap. XXV." On the Polarization of Light By Ordinary Refraction," Treatise on optics, Sir David Brewster, Longman, Brown, Green and Longmans, London, 1853, pp. 226–233.

Hellwarth: "Control of Fluorescent Pulsations," Advances in Quantum Electronics, ed. Singer, Columbia U Press, 1961, pp.334–341.

JEWELL H. PEDERSEN, *Primary Examiner.*

RONALD L. WIBERT, *Examiner.*